3,414,551
MODIFICATION OF CRYSTALLINE PROPYLENE POLYMERS

Donald E. Reid and Harold M. Spurlin, Wilmington, Del., assignors to Hercules Incorporated, a corporation of Delaware
No Drawing. Filed June 24, 1965, Ser. No. 466,815
5 Claims. (Cl. 260—88.2)

The present invention relates to a process for reacting maleic anhydride with crystalline propylene polymers.

"Crystalline propylene polymers" is used herein to connote the well-known high melting, crystalline polymers that are derived wholly or predominantly from propylene. The term thus includes the crystalline homopolymer of propylene which is sometimes referred to as stereoregular polypropylene or isotactic polypropylene, and also the crystalline copolymers of propylene with up to about 25 mole percent of another 1-olefin, such as ethylene, including those commonly referred to as "block copolymers."

As recently disclosed in Belgian Patent 652,324, it has been found that propylene polymers, both crystalline and amorphous, that have been modified by reaction of maleic anhydride have outstanding utility as an adhesive for adhering crystalline polypropylene to metal. The reaction of amorphous propylene polymer with maleic anhydride is relatively uncomplicated but the preparation of reaction products of maleic anhydride and crystalline propylene polymers is, at best, cumbersome and expensive. The most commonly recommended procedure comprises reacting the crystalline polymer with maleic anhydride in solution in an inert liquid organic solvent in the presence of an organic peroxide. This process requires separation of both solvent and excess maleic anhydride from the modified polymer, and is quite costly. Another process comprises mechanically working the polymer in the presence of maleic anhydride and a peroxide or oxygen. The latter process requires a temperature above the melting point of the polymer and is also expensive because of high investment and operating costs.

The object of the present invention is to provide a novel process for reacting crystalline propylene polymers with maleic anhydride which does not require a solvent and which can be operated at a temperature below the melting point of the polymer in relatively simple and inexpensive apparatus.

According to the invention, a crystalline propylene polymer in particulate form is agitated in contact with maleic anhydride and an organic peroxygen compound in an atmosphere of inert gas, such as nitrogen or carbon dioxide, and in the absence of a solvent at a temperature of from about 80° C. up to a temperature about 10° below the melting point of the polymer for a time to cause chemical reaction of the polypropylene with about 0.1 to 2.5% of maleic anhydride, based on the weight of polymer.

The process can be conducted in several ways. For example, the polymer, maleic anhydride, and peroxygen compound can be merely agitated together in an inert gas atmosphere at a temperature within the previously recited range until the desired amount of reaction has taken place. At the conclusion of the reaction any excess unreacted maleic anhydride can be separated from the reaction mixture by washing with water or another liquid. The reactor can be a simple stirred vessel, a double cone blender, a ribbon mill or any similar apparatus that provides the necessary agitation and heat transfer. Either batch or continuous operation is practical.

In an other embodiment the reaction is carried out with the crystalline polymer in a fluidized state using maleic anhydride vapors in the fluidizing gas. The peroxygen compound is premixed with the polymer, preferably by coating it on the polymer particles to ensure even distribution of the peroxygen compound and the polymer. As in the previous embodiment, the reaction is carried out in an inert atmosphere and at a temperature within the same range.

The crystalline propylene polymers useful in the invention include crystalline polypropylene, otherwise called stereoregular or isotactic polypropylene, and crystalline copolymers of propylene with a lesser amount of another olefin such as ethylene or butene-1. The copolymers can be either random copolymers or block copolymers. All such polymers are well known and are characterized by a melting point ranging from about 80 to 170° C. and high hardness and stiffness at room temperature.

It is essential in carrying out the process of the invention that the crystalline propylene polymer be in the form of small particles, although the particle size is not critical. The particle size and polymer can reasonably range from about 20 to 50 microns (average) up to about 300 microns, with a size of about 50 to 150 microns being preferred.

The organic peroxygen compounds that are preferred for use in the process are those that have a half life from about 0.1 to 2.0 hours at the chosen reaction temperature. Examples of these are benzoyl peroxide, tert-butyl perbenzoate, di-tert-butyl peroxide, bis($\alpha,\alpha$-dimethylbenzyl) peroxide, t-butyl peroxypivalate, lauroyl peroxide, 2,5-dimethyl-2,5-di(t-butylperoxy) hexane, and 2,2-bis(t-butylperoxy) butane. Generally the amount of peroxide used will be as small as is consistent with successful operation of the process. Usually an amount within the range of about 0.5 to 5.0% by weight of the polymer will be found satisfactory.

Maleic anhydride is used in the process in at least the amount sought to be combined with the polymer, whether it be used in the form of a solid or a gas. There is no restriction on the maximum amount of maleic anhydride that can be employed, and, as will be seen from subsequent examples, amounts many times the amount combined with the polymer have been successfully employed.

The amount of maleic anhydride to be combined with the polymer is quite variable. Broadly speaking, the objective of the invention is to prepare modified polymers which contain from about 0.2 to 10 weight percent of maleic substitution, calculated as the anhydride. More commonly, the amount will range from about 0.4 to 2.5 weight percent.

As the rate of reaction varies directly with temperature and with the activity of the peroxygen compound used, the time required to incorporate a given amount of maleic anhydride in the polymer will also vary. In practice, it is desirable to sample the reaction mixture from time to time to determine the extent of reaction and to terminate the reaction at the point at which the desired amount of anhydride has chemically combined with the polymer.

The invention will be illustrated by means of specific examples. In the examples, parts and percentages are by weight unless otherwise specified.

EXAMPLE 1

A reaction vessel was fitted with a condenser, a thermometer, a nitrogen inlet and a stirrer that scraped the bottom of the vessel. A Y was fitted to the top of the condenser with one leg leading to an aspirator and the other to a gas bubbling device. Forty (40) parts of micronized stereoregular polypropylene (average particle size of about 28 microns), 8.0 parts of ground maleic anhydride (20% on polymer), and 4.0 parts of benzoyl peroxide (10% on polymer) were charged to the vessel. The vessel was evacuated and then filled with nitrogen while stirring the reactants. This process was repeated three times. A steady stream of nitrogen was passed through the apparatus while the reactants were heated to 90° to 100° C. The temperature was maintained at 90° to 100° C. for about 2 hours and 40 minutes. The reactants were allowed to cool in a nitrogen atmosphere and the product was slurried with water and filtered. The filter cake was washed with chlorobenzene, benzene, and finally acetone. The resultant product had an intrinsic viscosity of 1.25 and contained 0.03% free anhydride, 0.5% combined anhydride, and 0.6% total anhydride by titration (all calculated as maleic anhydride).

EXAMPLE 2

The apparatus previously described was used in this reaction also. The vessel was charged with 40 parts of stereoregular polypropylene (average particle size of about 150 microns), 8.0 parts of ground maleic anhydride (20% on polymer), and 4.0 parts of di-tert-butylperoxide (10% on polymer). The vessel was evacuated and subsequently filled with nitrogen three times while stirring the reactants. The reactants were heated to 128° to 146° C. for 1.7 hours with stirring. Then an additional 2.0 parts of di-tert-butylperoxide (5.0% on polymer) was added to the reaction mixture and the mixture was maintained at 150°–155° C. for an additional 2.3 hours. After 4 hours reaction, stirring became difficult and the reaction was stopped. The cooled mixture was slurried in water and then washed with acetone to yield a polymer of 0.66 intrinsic viscosity that contained 2.15% of combined anhydride and 0.05% of free anhydride, calculated as maleic anhydride.

EXAMPLE 3

The previously described apparatus was used. The vessel was charged with 40 parts of the same polymer as Example 2, 8.0 parts of ground maleic anhydride (20% on polymer), and 4.0 parts of tert-butylperbenzoate (10% on polymer). The vessel was evacuated and filled with nitrogen three times. Under stirring the reactants were heated to 130° C. using an oil bath and held at that temperature for 3.0 hours. The reaction mixture was cooled and worked up as previously described to yield a product of 0.92 intrinsic viscosity that contained 1.7 combined anhydride and 0.1% free anhydride, calculated as maleic anhydride.

EXAMPLE 4

A 2 in. x 24 in. cylindrical fluid bed was preheated to 130° C. by passing hot nitrogen gas through the column and then into a water-filled gas absorption bottle. One hundred (100) grams of stereoregular polypropylene (average particle size about 70 microns) containing 1.2 grams of t-butylperbenzoate was charged to the fluid bed reactor and brought to 130° C. over a 20-minute period. Twenty (20) grams of maleic anhydride contained in an aluminum dish were placed in the hot nitrogen stream prior to its entrance into the fluid bed. The reactor was controlled at 130±2° C. for 5 hours using a gas rate of 0.38 ft.³/min. The product was cooled to room temperature under nitrogen. During the reaction, 17.4 grams of maleic anhydride was actually passed through the fluid bed. Analysis showed the resultant product to contain 0.07% combined anhydride (calculated as maleic anhydride) and to have an intrinsic viscosity of 2.0.

EXAMPLE 5

After the fluid bed reactor was preheated to 140° C. following the procedure of Example 4, 100 grams of flake polypropylene containing 2.0 grams of bis($\alpha,\alpha$-dimethylbenzyl) peroxide were placed in the reactor and the temperature again brought to 140° C. Twenty (20) grams of maleic anhydride were placed in the hot nitrogen stream and the fluid bed controlled at 140° C. for 3.0 hours. The resultant product contained 0.5% combined anhydride and had an intrinsic viscosity of 1.3.

EXAMPLE 6

Sixty (60) grams of flake polypropylene were slurried in a solution of 2.4 grams of maleic anhydride (4.0% on polymer) and 1.2 grams of bis($\alpha,\alpha$-dimethylbenzyl) peroxide (2.0% on polymer) in 150 ml. of acetone in a 500 ml. flask fitted with a stirrer that scrapes the walls of the flask, a thermometer, a nitrogen inlet and a stripping head. With stirring the acetone was rapidly stripped from the slurry using an oil bath at 80–90° C. The flask was evacuated and filled with nitrogen three times and then the tumbling reaction mixture was held at 145±3° C. for 3 hours using an oil bath as a source of heat. After cooling the reaction mixture, 200 ml. of acetone was added and the mixture refluxed for 1 hour. The resultant slurry was filtered and washed once with 125 ml. of acetone to yield a product containing 0.5% combined anhydride and 0.05% free anhydride and having an intrinsic viscosity of 0.82.

What we claim and desire to protect by Letters Patent is:

1. A process for reacting maleic anhydride with a crystalline propylene polymer which comprises fluidizing said polymer in particulate form in contact with vapors of maleic anhydride and an organic peroxygen compound in an atmosphere of inert gas at a temperature of from about 80° C. up to a temperature about 10° below the melting point of the polymer in the absence of a solvent for the polymer for a time to cause chemical reaction of the polymer with from about 0.2 to 10% of maleic anhydride, based on the weight of the polymer.

2. A process according to claim 1 in which the crystalline propylene polymer is crystalline polypropylene.

3. The process of claim 1 in which the crystalline propylene polymer is a crystalline copolymer of propylene with up to 25 mole percent of another 1-olefin.

4. The process of claim 1 in which the particle size of the polymer ranges from about 20 to 300 microns (average).

5. The process of claim 1 in which the organic peroxygen compound has a half life from about 0.1 to 2.0 hours at the reaction temperature.

References Cited

UNITED STATES PATENTS

| | | |
|---|---|---|
| 2,973,344 | 2/1961 | Fasce. |
| 2,933,468 | 4/1960 | Aldridge et al. |
| 3,161,620 | 12/1964 | Perkins et al. |

JOSEPH L. SCHOFER, *Primary Examiner.*

L. EDELMAN, *Assistant Examiner.*